(12) United States Patent
Norton et al.

(10) Patent No.: US 12,056,562 B2
(45) Date of Patent: Aug. 6, 2024

(54) DEVICE FOR MEASURING NUTRITIONAL INTAKE

(71) Applicants: Spencer Charles Norton, Leo, IN (US); Christopher Russell, Leeds (GB)

(72) Inventors: Spencer Charles Norton, Leo, IN (US); Christopher Russell, Leeds (GB)

(73) Assignee: NorviTech, Inc., Leo, IN (US)

( * ) Notice: Subject to any disclaimer, the term of this patent is extended or adjusted under 35 U.S.C. 154(b) by 0 days.

(21) Appl. No.: 17/983,939

(22) Filed: Nov. 9, 2022

(65) Prior Publication Data

US 2023/0148237 A1 May 11, 2023

Related U.S. Application Data

(60) Provisional application No. 63/277,240, filed on Nov. 9, 2021.

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .......... G06K 7/10366; G06K 19/0723
USPC .......................................... 235/451
See application file for complete search history.

(56) References Cited

U.S. PATENT DOCUMENTS

| | | | |
|---|---|---|---|
| 6,924,441 B1 | 8/2005 | Mobley | |
| 8,684,922 B2 | 4/2014 | Tran | |
| 9,641,969 B2 | 5/2017 | Theurer | |
| 9,711,029 B2 | 7/2017 | Ribble | |
| 9,760,749 B2 * | 9/2017 | Duckett | B41J 2/335 |
| 10,089,505 B1 * | 10/2018 | Huebner | G06K 7/10415 |
| 2007/0050271 A1 | 3/2007 | Ufford | |
| 2014/0034520 A1 * | 2/2014 | Scicluna | H01Q 17/00 150/132 |
| 2015/0125832 A1 | 5/2015 | Tran | |
| 2015/0325365 A1 * | 11/2015 | Song | H02J 50/12 307/104 |
| 2018/0232689 A1 * | 8/2018 | Minvielle | G06T 7/194 |
| 2018/0247092 A1 * | 8/2018 | Khojastepour | G06K 7/10069 |
| 2020/0402653 A1 * | 12/2020 | Koh | G16H 40/63 |
| 2020/0408588 A1 * | 12/2020 | Gregory | G01G 3/145 |
| 2022/0039358 A1 * | 2/2022 | Wernimont | G16H 20/60 |
| 2022/0322860 A1 | 10/2022 | Taylor | |

FOREIGN PATENT DOCUMENTS

AU 2008100432 B4 9/2008

* cited by examiner

*Primary Examiner* — Allyson N Trail

(74) *Attorney, Agent, or Firm* — Indiana Univ. Maurer School of Law IP Legal Clinic

(57) ABSTRACT

The present disclosure provides a device for measuring nutritional intake. The device includes a housing, an intake cell, and a controller. The housing has a support surface. The intake cell has a radio frequency identification (RFID) reader and a load sensor. The controller is configured to receive data from the RFID reader and the load sensor to associate a weight of a container with an RFID tag of the container. The RFID reader is supported by the housing to detect the RFID tag of the container positioned on the support surface. The load sensor is supported by the housing to measure the weight associated with the container.

20 Claims, 5 Drawing Sheets

DEVICE FOR MEASURING NUTRITIONAL INTAKE

CROSS-REFERENCE TO RELATED APPLICATIONS

The application claims the benefit of U.S. Provisional Application No. 63/277,240, filed on Nov. 9, 2021, and entitled "DEVICE FOR MEASURING NUTRITIONAL INTAKE," the complete disclosure of which is expressly incorporated by reference herein.

TECHNICAL FIELD

The present disclosure is directed to a measurement device. More specifically, this disclosure describes a measurement device for collecting and calculating the nutritional intake of consumed food and drink.

BACKGROUND AND SUMMARY OF THE DISCLOSURE

Accurately measuring the nutritional content of food and liquid intake is important for health-conscious individuals. Elderly and handicapped populations, as well as those under the care of others in nursing homes, hospitals, at home, etc., often require a delicate balance of nutrients to maintain a healthy lifestyle. Ensuring adequate nutrient intake is a challenging task when a meal or serving is not fully finished. In place of estimating consumption, the present disclosure relates to a system for measuring the weight of food and drink before and after consumption to determine a person's actual nutritional intake more accurately. The measurement device uses intake cells to measure the weight of RFID tagged tableware throughout a meal or snack. Collected nutritional data is stored on a controller and displayed on a user interface.

The statements mentioned above are intended to facilitate understanding of the present disclosure. The statements to be read in this light should not be construed as admissions of the prior art.

SUMMARY OF THE DISCLOSURE

According to the present disclosure, a device for measuring nutritional intake comprises a housing, an intake cell, and a controller. The housing has a support surface. The intake cell has a radio frequency identification (RFID) reader and a load sensor. The controller is configured to receive data from the RFID reader and the load sensor to associate a weight of a container with an RFID tag of the container. The RFID reader is supported by the housing to detect the RFID tag of the container positioned on the support surface. The load sensor is supported by the housing to measure weight associated with the container.

According to another embodiment of the present disclosure, a method for measuring nutritional intake is provided. The method includes the steps of identifying a container with a RFID tag by an RFID reader, measuring a first weight of a content in the container, measuring a second weight of the content in the container, calculating a weight difference between the first weight and the second weight, calculating a nutritional intake based on the weight difference of the content, and displaying the nutritional intake on a user interface.

Figure 1:
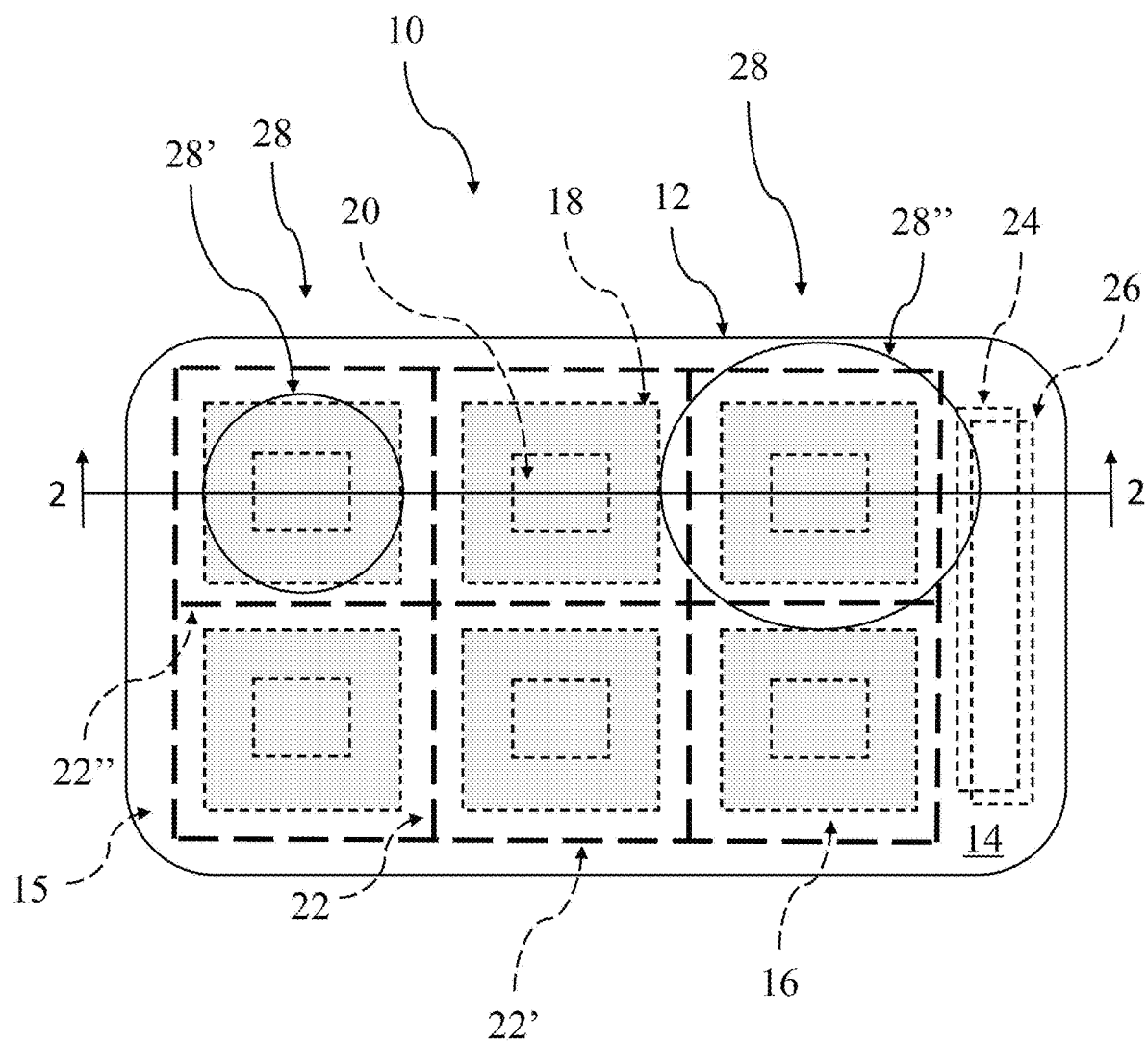
FIG. 1 is a top view of a measurement device according to the present disclosure showing six intake cells with the components of each intake cell shown in phantom.

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. Unless otherwise indicated or apparent, the components shown in the figures are proportional to each other. It will be understood that no limitation of the scope of the disclosure is thereby intended. The disclosure includes any alterations and further modifications in the illustrative devices and described methods and further applications of the principles of the disclosure, which would normally occur to one skilled in the art to which the disclosure relates.

DETAILED DESCRIPTION

As depicted in FIGS. 1-4, a nutritional intake measurement device 10 is provided for measuring nutritional intake. Measurement device 10 measures the intake of nutrients, such as food, water, etc., by a patient or other person from an RFID tagged tableware item 28. Based on the measurement, a care provider, system, etc., can monitor the nutritional intake of the person and adjust or maintain the nutritional intake of the person.

Figure 2:
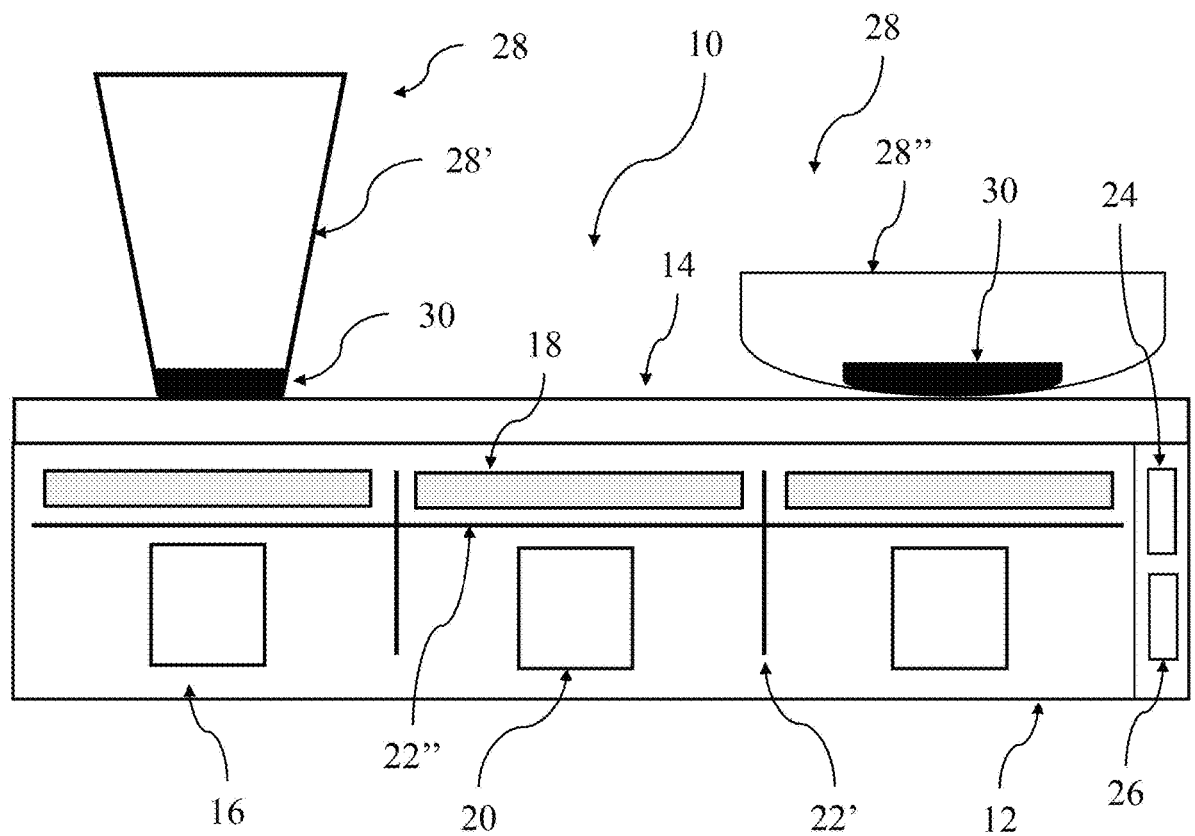
FIG. 2 is a cross-sectional view of the measurement device taken along line 2-2 of FIG. 1 showing three intake cells connected in tandem with a cup placed above one intake cell and a bowl placed above another intake cell.
Figure 3:
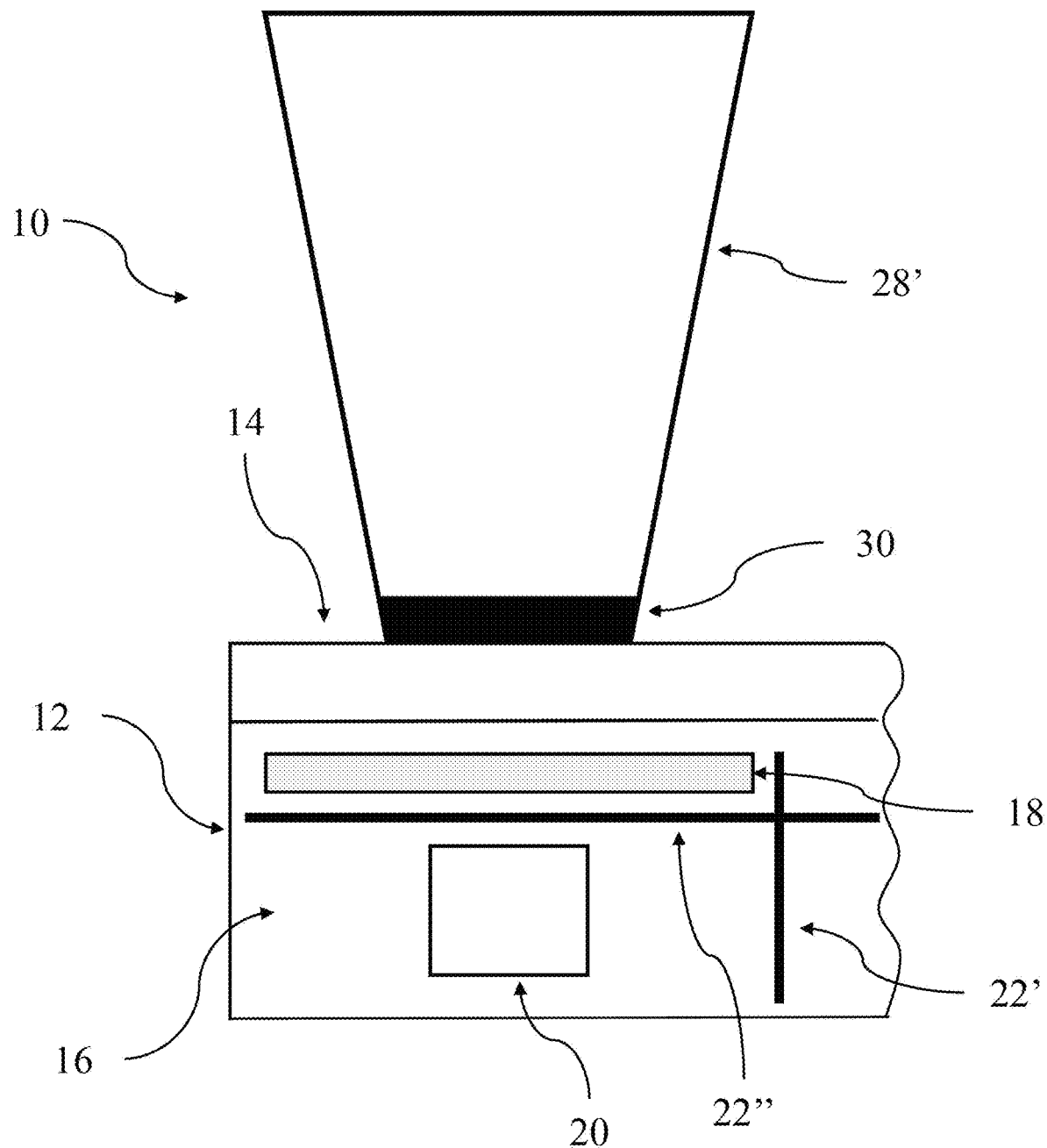
FIG. 3 is an enlarged view of a portion of FIG. 2.
Figure 4:
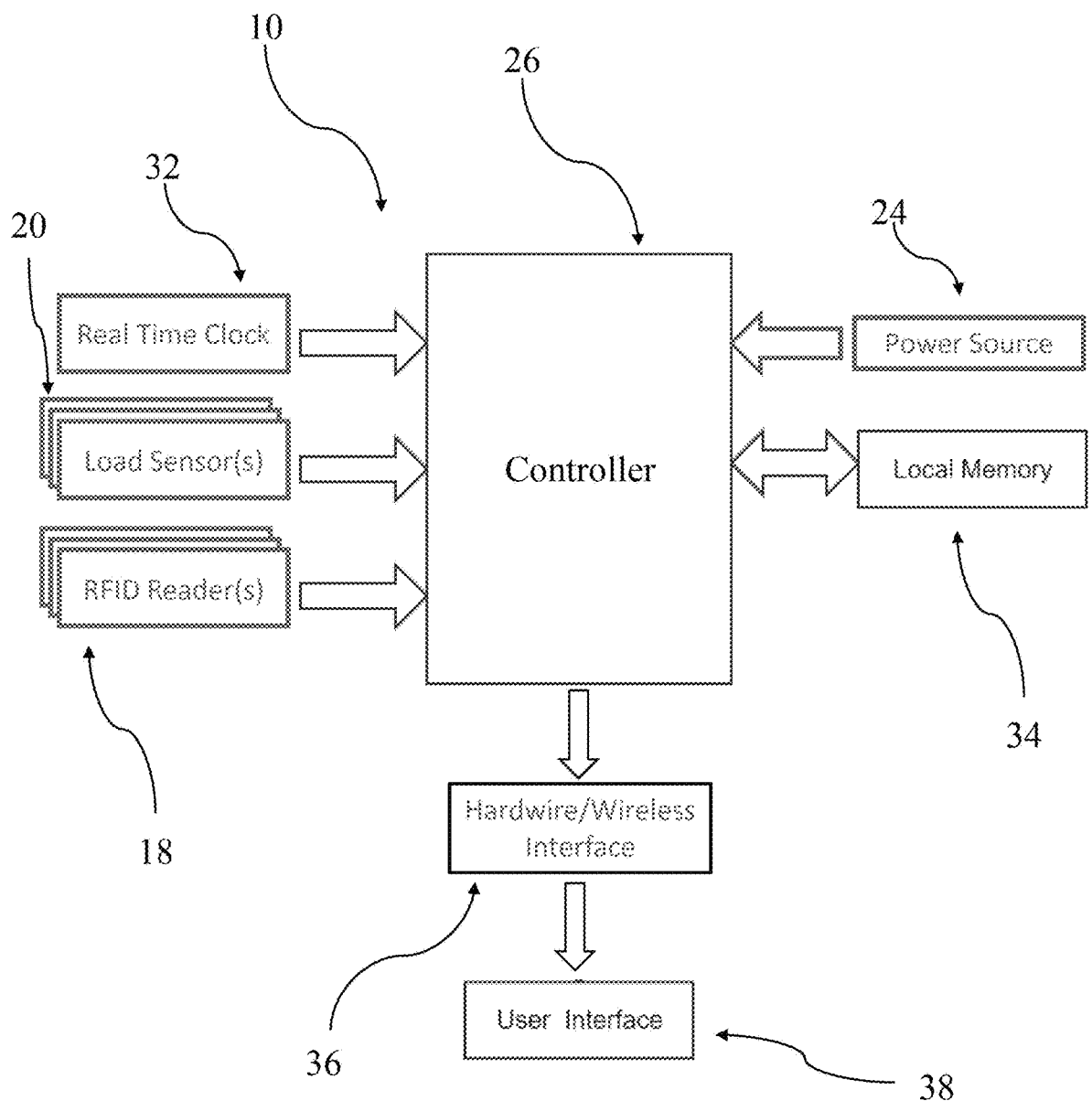
FIG. 4 is a diagrammatic view of the electronic components of the measurement device.

Measurement device 10 includes a housing 12, a support surface 14 such as a platform, tray, table, etc., and one or more intake cells 16 positioned below support surface 14. Intake cells 16 may connect in tandem or operate independently. Intake cells 16 include an RFID reader 18 and a load sensor 20. When intake cells 16 are used in tandem, as shown in FIGS. 1 and 2, intake cells 16 are separated by interference shielding material 22. Vertical interference shielding material 22' and horizontal interference shielding material 22" reduce interference between adjacent RFID readers 18. Interference shielding material 22 absorbs or deflects RFID signals thereby preventing RFID readers 18 from detecting RFID tagged tableware items 28 placed on adjacent intake cells 16. In some embodiments, interference shielding material 22 is made of aluminum, an aluminum alloy, another metal, or other shielding materials.

According to one embodiment, in a grid 15 of intake cells 16, activation of one RFID reader 18 deactivates adjacent RFID readers 18 in adjacent intake cells 16. Vertical interference shielding material 22' and horizontal interference shielding material 22" reduce the likelihood of RFID signals crossing into adjacent intake cells. Such crossing may result in inaccurate weight measurements and nutrition calculations.

To use measurement device 10, RFID tagged tableware item 28 that includes an RFID tag 30 can be placed on support surface 14 above intake cells 16 at the start of a meal or snack. Intake cells 16 then measure the identity and initial weight of RFID tagged tableware item 28. As the meal progresses, a user repeatedly picks up and sets down RFID tagged tableware item 28. Data is collected throughout the meal or snack and stored on a local memory 34 of a controller 26. A real time clock 32 controls the timing function of measurement device 10.

Controller 26 uses the change in weight measurements of RFID tagged tableware item 28 to calculate the nutritional intake of the liquid or food consumed. The nutritional intake of consumed liquid or food is displayed on a user interface 38. User interface 38 is connected to controller 26 with a hardwire or wireless interface 36. Measurement device 10 is powered by a power source 24 such as a battery, DC power supply, etc.

According to one embodiment of measurement device 10, a variety of RFID tagged tableware items 28 such as cups, bowls, plates, etc., may be used simultaneously. For example, as shown in FIG. 1, one of RFID tagged tableware items 28 may be a cup 28' containing water and another RFID tagged tableware item 28 may be a bowl 28" containing soup. In this embodiment, the user may pick up cup 28', drink, and replace cup 28' on any intake cell 16 of measurement device 10. RFID reader 18 of each intake cell 16 is capable of identifying cup 28', and load sensor 20 of each intake cell 16 is capable of measuring the weight of cup 28'. Similarly, the user may pick up bowl 28", eat, and replace bowl 28" on any intake cell 16 of measurement device 10. As such, the nutritional intake of cup 28' and bowl 28" can be measured simultaneously throughout a meal. Measurements may be observed on user interface 38.

Figure 5:
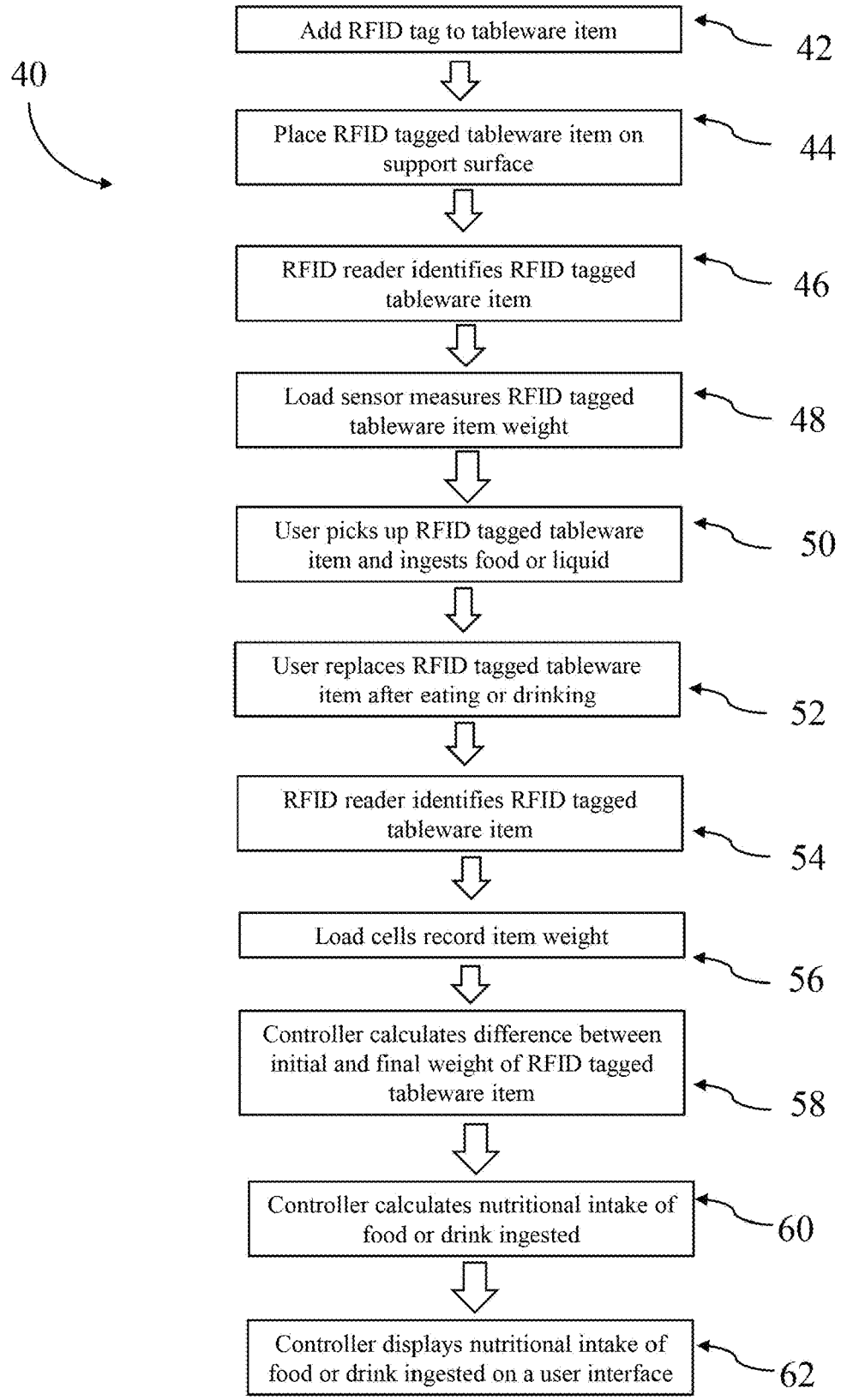
FIG. 5 is a flow diagram of a nutritional intake data collection process.

FIG. 5 shows diagrammatically a nutritional intake data acquisition operation method of one embodiment of measurement device 10, as also described herein. Method 40 begins with tagging step 42. At tagging step 42, RFID tag 30 is added to a tableware item After tagging step 42, placement step 44 occurs wherein RFID tagged tableware item 28 is placed on support surface 14.

At identification step 46, RFID reader 18 identifies RFID tagged tableware item 28. After identification step 46, method 40 proceeds to measurement step 48 during which load sensor 20 measures the weight of RFID tagged tableware item 28. After measurement step 48, ingestion step 50 occurs. At ingestion step 50, the user picks up RFID tagged tableware item 28 and ingests food or liquid from RFID tagged tableware item 28. In a subsequent replacement step 52, the user replaces RFID tagged tableware item 28 on support surface 14. After replacement step 52, a reidentification step 54 occurs wherein RFID reader 18 identifies replaced RFID tagged tableware item 28. In a subsequent remeasuring step 56, load sensor 20 measures the weight of replaced RFID tagged tableware item 28.

After remeasuring step 56, a weight calculation step 58 occurs. At weight calculation step 58, controller 26 calculates the difference between the initial weight and final weight of RFID tagged tableware item 28. In a subsequent nutritional intake calculation step 60, controller calculates the nutritional intake of food or drink ingested by the user based on the differences calculated in step 58. Lastly, a displaying step 62 occurs at which the nutritional intake of the food or liquid ingested by the user is displayed on user interface 38. The nutritional intake may be indicated by a weight, volume (based on a known density of the nutrient), calories (based on a known caloric value of a nutrient), etc.

What is claimed is:

1. A device for measuring nutritional intake, comprising:
   a housing having an edge surrounding a substantially continuous support surface;
   a plurality of intake cells having an RFID reader and a load sensor, the plurality of intake cells being positioned below the support surface; and
   a controller configured to receive data from the RFID reader and the load sensor to associate a weight of a container with an RFID tag of the container, the RFID reader being supported by the housing to detect the RFID tag of the container positioned on the support surface and the load sensor being supported by the housing to measure weight associated with the container.

2. The device for measuring nutritional intake of claim 1, wherein the plurality of intake cells is arranged in a grid pattern.

3. The device for measuring nutritional intake of claim 1, wherein the plurality of intake cells is connected in tandem.

4. The device for measuring nutritional intake of claim 1, wherein the plurality of intake cells operate independently.

5. The device for measuring nutritional intake of claim 1, further comprising a shielding material positioned between RFID readers of adjacent intake cells to shield radio frequency signals.

6. The device for measuring nutritional intake of claim 5, wherein the shielding material includes a vertical shielding material which reduces horizontal interference from an adjacent RFID reader.

7. The device for measuring nutritional intake of claim 5, wherein the shielding material includes a horizontal shielding material which reduces vertical interference from an adjacent RFID reader.

8. The device for measuring nutritional intake of claim 5, wherein the shielding material is made of at least one of aluminum and an aluminum alloy.

9. The device for measuring nutritional intake of claim 1, wherein the RFID reader is a first RFID reader configured to deactivate an adjacent second RFID reader when the first RFID reader is in an activation status.

10. The device for measuring nutritional intake of claim 1, wherein the plurality of intake cells detect an identity and the weight which are associated with the RFID tag.

11. The device for measuring nutritional intake of claim 1, wherein the RFID reader is positioned on the load sensor.

12. The device for measuring nutritional intake of claim 1, wherein the controller uses a change in weight measurement of the container with the RFID tag to calculate a nutritional intake.

13. The device for measuring nutritional intake of claim 1, further comprising:
   a power source connected to the controller to provide power for the device;
   a local memory connected to the controller to store the data from the RFID reader and the load sensor; and
   a real time clock connected to the controller and configured to control a timing function of the device.

14. A method for measuring nutritional intake, comprising the steps of:
   identifying a container with a RFID tag by an RFID reader;
   measuring a first weight of a content in the container prior to intake of nutrition by a person;
   measuring a second weight of the content in the container after intake of nutrition by the person;

calculating a weight difference between the first weight and the second weight;

calculating a nutritional intake of the person based on the weight difference of the content; and displaying the nutritional intake on a user interface.

15. The method for measuring nutritional intake of claim 14, further comprising a step of disabling an adjacent RFID reader.

16. The method for measuring nutritional intake of claim 14, further comprising a step of reidentifying the container with the RFID tag by the RFID reader.

17. The method for measuring nutritional intake of claim 14, further comprising a step of recording the first weight value and the second weight value to a local memory.

18. The method for measuring nutritional intake of claim 14, wherein the nutritional intake is indicated and switched between a weight unit, a volume unit, and a Calorie unit.

19. A method for measuring nutritional intake, comprising the steps of:

identifying a container with a RFID tag by an RFID reader;

measuring a first weight of a content in the container;

measuring a second weight of the content in the container;

calculating a weight difference between the first weight and the second weight;

calculating a nutritional intake based on the weight difference of the content;

displaying the nutritional intake on a user interface; and adjusting a nutritional intake of a person based on the calculated nutritional intake.

20. The method for measuring nutritional intake of claim 19, wherein the content is water and the container is a cup.

* * * * *